United States Patent [19]
Sykora

[11] 3,837,093
[45] Sept. 24, 1974

[54] APPARATUS FOR THE DETERMINATION OF THE QUALITY OF A PUPIL'S RESPONSE

[75] Inventor: Richard Sykora, Prague, Czechoslovakia

[73] Assignee: Ceske vysoke uceni technicke v Praze, Praha, Czechoslovakia

[22] Filed: May 25, 1973

[21] Appl. No.: 364,139

[30] Foreign Application Priority Data
May 25, 1972 Czechoslovakia .................. 3959-72

[52] U.S. Cl. .................................. 35/9 A, 318/480
[51] Int. Cl. ............................................ G09b 7/04
[58] Field of Search ............. 35/9 R, 9 A, 9 B, 8 R, 35/22 R, 66; 318/480

[56] References Cited
UNITED STATES PATENTS

| | | | |
|---|---|---|---|
| 3,055,113 | 9/1962 | Grandjean | 35/66 X |
| 3,382,588 | 5/1968 | Serrell et al. | 35/9 A |
| 3,516,176 | 6/1970 | Cleary et al. | 35/9 A |
| 3,522,664 | 8/1970 | Lambright et al. | 35/8 R |
| 3,596,376 | 8/1971 | Avedissian et al. | 35/22 R |
| 3,698,100 | 10/1972 | Frank | 35/9 A |

Primary Examiner—Wm. H. Grieb

[57] ABSTRACT

Apparatus for the determination of the quality of a pupil's response in an automatic teaching machine with a slide projector. The apparatus comprises a horizontal scanning coordinate system and a vertical coordinate scanning system on each of which there is a movable lamp and a corresponding movable phototransistor and a focussing screen provided with contacts which control the drive of both said systems.

5 Claims, 5 Drawing Figures

APPARATUS FOR THE DETERMINATION OF THE QUALITY OF A PUPIL'S RESPONSE

The invention concerns a device for the determination of a pupil's response quality in an automatic teaching machine, such device being provided with a slide projector. The device of the invention uses the principle of the localization of a point or of an area on a projected image, where at the same time the localization of the point and the adjustment of the photoelements, which scan the luminous code, is performed automatically. An electrooptic system is used for the adjustment of the position of the scanning photoelements; such system controls the movement of the scanning photoelements in the direction of both coordinate axes.

The well known devices which discern the quality of a pupil's response in automatic teaching machines are altogether controlled by the pupil by means of various mechanical and electromechanical systems: at the same time the required manipulation encumbers the pupil, distracts him and diverts him from the object of the teaching; as a consequence, the effectiveness of the teaching machine is considerably diminished.

The device of the invention for the determination of a pupil's response quality in an automatic teaching machine with a slide projector, removes the disadvantages of prior known devices.

The device of the invention comprises a horizontal coordinate system and a vertical coordinate system on which there are movably placed lamps and phototransistors, and it further comprises a focussing screen provided with contacts; the drive of both the systems is provided by an electric motor which is provided with pulleys. The contacts are situated in the corners of the focussing screen, and are parallely interconnected. The shaft of the electric motor is fixedly connected to a disc to both sides of which there are connected pulleys, there being an electromagnet disposed opposite every pulley. The contacts situated on the focussing screen are connected to a monostable flip-flop circuit, the output of such circuit controls the lamps, and further, through a delay circuit and a switch circuit, the output is connected to the winding of the electric motor. Finally, according to a last feature of the invention, there are phototransistors which are connected through monostable flip-flop circuits to the windings of an electromagnet and of a brake.

The device of the invention automatically indicates the point which is shown by the pupil on the projected image. By comparison of the position of the scanning photoelements with a luminous code on the projected image there can be obtained a disclosure of the quality of the pupil's response, and according to this quality there can be secured a further operation of the automatic teaching machine. The indication of the point on the image can be performed by any object which affects the intensity of the light which goes through this object because the indication of the point is performed optically. The device according to the invention brings about a considerable improvement of the quality and of the effectiveness of the program lessons because it enables the pupil's response to be determined in the case where the response is formulated by a mere indication of a definite point on the projected image. During the formulation of the response it is not necessary to perform any manipulation with the automatic teaching machine.

The device according to the invention is shown by way of illustration in the accompanying drawings, wherein.

Figure 5:
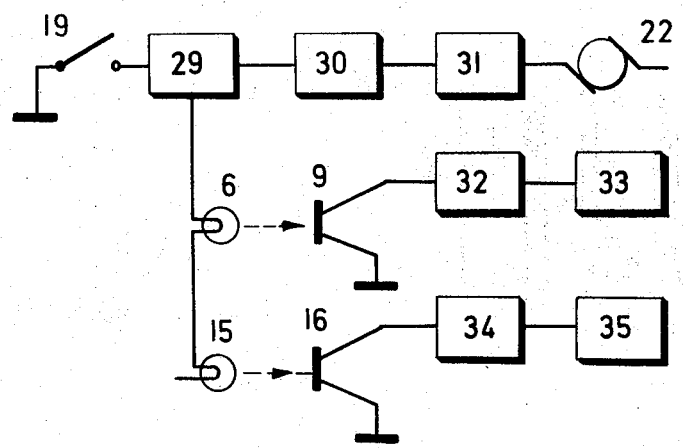

FIG. 5 a block diagram of the circuit of the electrical portion of the device of the invention.

Figure 1:
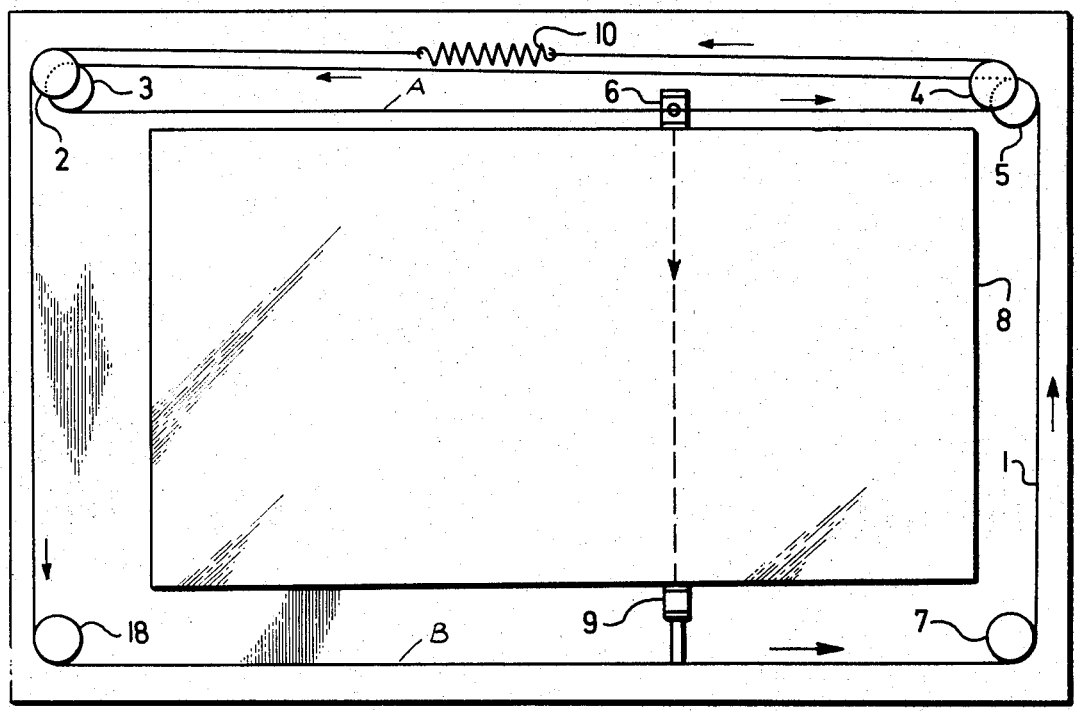
FIG. 1 shows schematically an embodiment of the system for traversing the photoelement and the electrooptic system in the direction of the horizontal coordinate axis.

A driving cord 1, which runs around pulleys 2,3, and 4,5 which are substantially formed by a single pulley with two guiding grooves, as can be seen in FIG. 1, serves to move the system in the direction of the horizontal coordinate axis. In the drawing these pulleys are shown in a displaced position so as to show the guiding of the driving cord 1. The cord 1 runs successively in a run A from pulley 3 to pulley 4, from pulley 4 to pulley 2, from pulley 2 to pulley 18, from pulley 18 in a run B to pulley 7, from pulley 7 to pulley 5, and from pulley 5 to pulley 3. The runs A and B of the cord 1 always travel in the same direction and at the same velocity. A lamp 6, slidable along the upper edge of a focussing screen 8, is affixed to run A of the cord 1. A phototransistor 9, diposed opposite lamp 6, is affixed to run B of cord 1, and slides along the lower edge of focussing screen 8.

Figure 2:
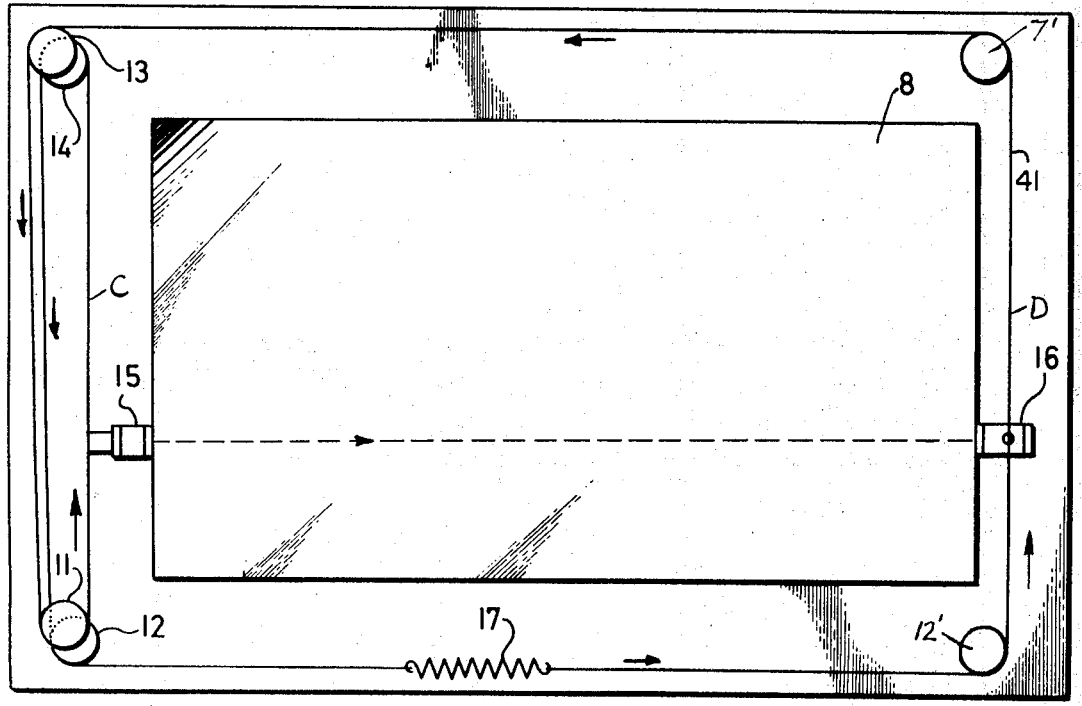
FIG. 2 shows schematically the means for traversing such member in the direction of the vertical coordinate axis.

The relative directions of travel of the cord in its various runs is shown by means of arrowheads. The cord is driven by an electric motor through the pulley of a friction clutch 7, light travels from the lamp 6 to the phototransistor 9 as shown by a dash line; a cutting off of such light beam results in stopping the movement of the cord 1. The driving cord 1 is tensioned by a spiral spring 10 interposed between the edges of the cord. The movement of the system in the vertical direction is effected in the manner shown in FIG. 2. This is substantially the same arrangement as that shown in FIG. 1, dimensioned according to the dimensions of the focussing screen 8. It comprises the pulleys 11, 12, 13, 14, a lamp 15, a phototransistor 16 and a spiral spring 17. The pulleys 11,12 and the pulleys 13,14 are in the form of one pulley with two grooves for the driving cord 41.

The cord 41 runs successively in a run C from pulley 11 to pulley 14, from pulley 14 to pulley 12, from pulley 12 to pulley 12', from pulley 12' in a run D to drive pulley 7' and from pulley 7' to pulley 13, and from pulley 13 to pulley 11. The lamp 15 is affixed to run C of cord 41, and the phototransistor 16 is affixed to run D of cord 41 opposite lamp 15. The light beam from lamp 15 to phototransistor 16 travels beneath the screen 8 as shown by a dash line in FIG. 2. The runs C and D of cord 41 always travel in the same direction and at the same velocity.

Figure 3:
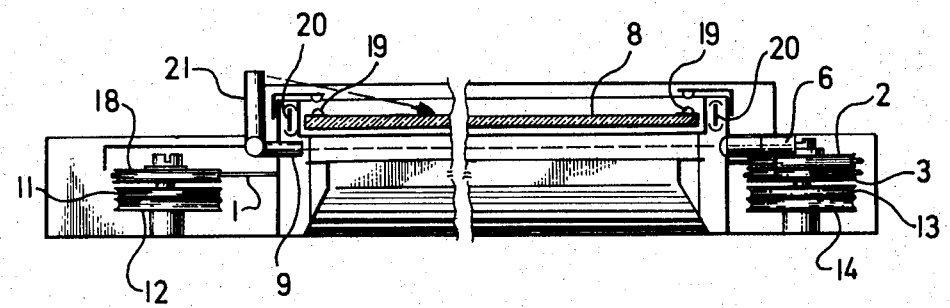
FIG. 3 is a view in a cross section across the focussing screen and the arrangement of its mechanical parts.

FIG. 3 shows the arrangement of the parts of the entire system in cross section through the center of the focussing screen 8 across to the pulleys 18,11,12 and 2,3,13,14. The focussing screen 8 can move in a narrow range in a direction that is normal to its surface.

Contacts 19 are situated in the corners between the focussing screen 8 and its supporting structure. All the contacts are connected in parallel so that their interconnection takes place in the case of a pressure which closes any contact. Springs 20 constantly urge the focussing screen 8 into its initial contact 19 open position.

FIG. 3 shows the lamp 6 which as shown in FIG. 1 moves in the direction of the horizontal axis of the projected image. As above explained, lamp 6 is fixed to the driving cord 1 which secures its movement in the same direction and with the same velocity as the transistor 9 toward which the lamp 6 directs a light beam beneath the screen 8. On the same holder as that which supports the phototransistor 9 there is positioned a photoelement 21 which emits the luminous code which appears as the image projected on the focussing screen 8. The direction of the projection of the code is shown by an arrowhead on the photoelement 21. An other photoelement 21 (not-illustrated) is mounted on the holder which supports the phototransistor 16 for emitting a luminous code for projection on the focussing screen 8.

Figure 4:
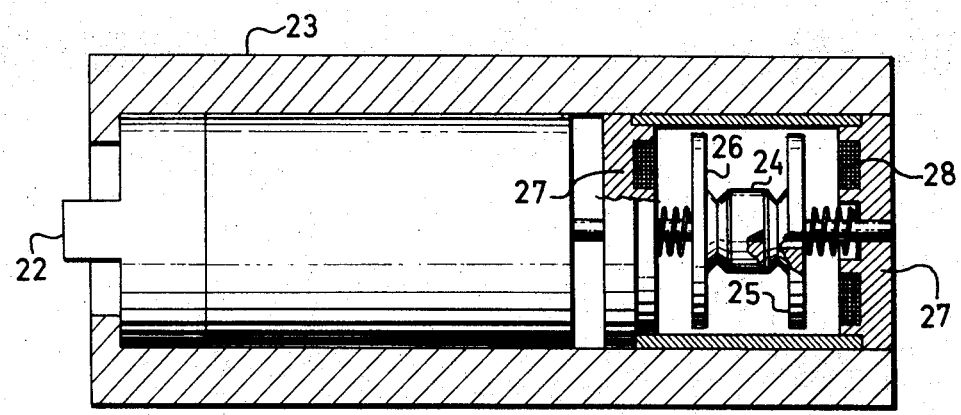
FIG. 4 shows the drive of the electric motor and the arrangement of the electromagnetic brakes and clutches.

The mechanism for driving the horizontal and vertical scanning systems are shown in FIG. 4. It includes a small reversible electric motor 22 which is inserted, with its attendant mechanism of electromagnetic clutches 24,25 and 24,26 and brakes (not shown in FIG. 4) in a housing 23. Only a disc 24 has a solid connection with the drive shaft of the electric motor. Gears 25 and 26 are pressed against disc 24 by means of coil compressor springs. Pulleys 25 and 26 are provided with grooves in which there is guided the driving cord 1. The gears 25 and 26 are mounted for free rotation on the motor drive. The disc 24 has material having a high friction coefficient on the sides thereof confronting the pulleys. The springs act upon the pulleys through tie plates with a small friction coefficient. An electromagnet 27 with a winding 28 is situated axially outwardly (with respect to disc 24) of each of gears 25 and 26.

One of gears 25,26 is connected by a gear train (not shown) to the driving pulley 7 (FIG. 1) for the horizontal scanning system. The other of gears 25,26 is connected by a gear train (not shown) to driving pulley 7' (FIG. 2) for the vertical scanning system.

The stopping of the movement of the horizontal and vertical scanning systems of the phototransistors is performed by means of a current flowing through the winding 28 of the respective electromagnet 27. If a sufficiently large current flows through the winding 28 then the electromagnet 27 operates, the respective gear 25 or 26 and the air gap between the electromagnet 27 and the gear 25 or 26 disappears, and the rotational movement of such gear is instantly stopped. The electric motor 22 rotates continuously and continues to drive the second gear until current is cut off from the other one of the electromagnets 26,27 so that rotation of the second gear is stopped.

The block diagram of the circuitry for the automatic control of the systems of the phototransistors is schematically shown in FIG. 5. As already mentioned, the contacts 19 (here shown as a single contact) are controlled by the vertical movement of the focussing screen 8. The closing of any one contact 19 brings into activity a monostable flip-flop circuit 29 the output of which controls energization of the lamp 6 and the lamp 15 which illuminate the phototransistors 2 and 16 respectively. The monostable flip-flop circuit 29 sends across a delay circuit 30 a signal in a switching circuit 31 which controls the energization of the winding of the electric motor 22. The delay of transmission of the signal between the circuits 29 and 31 depends upon the time required for the heating up of the filaments of the lamps 6 and 15. The phototransistor 9 serves for the stopping of the movement of the first horizontal scanning systems which phototransistor after the interruption of the light beam emitted by the lamp 6 sends a signal in a second monostable flip-flop circuit 32 and this secures in its temporary stable condition the delivery of the current for the winding of the electromagnet of the respective one of clutches 24,26 and 24,25 and of the brake 33. The phototransistor 16 has also a similar function; this phototransistor after the interruption of the light beam emitted by the lamp 15 sends a signal for a change of the condition of a third monostable flip-flop circuit 34 which in its temporary stable condition secures the delivery of the current for the winding of the electromagnet of the other of the clutches 24,25 and 24,26 and of the brake 35.

Although the invention is illustrated and described with reference to one preferred embodiment thereof, it is to be expressly understood that it is in no way limited to the disclosure of such a preferred embodiment but is capable of numerous modifications within the scope of the appended claims.

What is claimed is:

1. Apparatus for the determination of the quality of a pupil's response in an automatic teaching machine with a slide projector, comprising a horizontal coordinate scanning system and a vertical coordinate scanning system, each such systems having a movable lamp and a correspondingly movable phototransistor, drive means for each of said systems, means for starting and stopping the drive means for each of said systems; and focussing screen provided with contacts which control the means for starting and of stopping each of said systems.

2. Apparatus according to claim 1, wherein the contacts are located at the corners of the focussing screen are connected in parallel and are operated by depression of the screen by the pupil.

3. Apparatus according to claim 1, wherein the drive means for each of said systems comprises an electric motor for driving the two scanning systems, the shaft of the electric motor being fixedly connected to clutches comprising a disc against which there are pressed driven members on both sides and an electromagnet opposite each driven member.

4. Apparatus according to claim 3 wherein the contacts on the focussing screen are connected to a monostable flip-flop circuit the output of which controls the lamps, and a delay circuit interposed between the output of the flip-flop circuit and a switch circuit to the winding of the electric motor.

5. Apparatus according to claim 4, wherein the phototransistors are connected through further monostable flip-flop circuits to the respective windings of the electromagnets of the clutches and to respective brakes.

* * * * *